US012664466B2

(12) United States Patent
Mwanje

(10) Patent No.: US 12,664,466 B2
(45) Date of Patent: Jun. 23, 2026

(54) DISTRIBUTED TRAINING IN COMMUNICATION NETWORKS

(71) Applicant: NOKIA TECHNOLOGIES OY, Espoo (FI)

(72) Inventor: Stephen Mwanje, Dorfen (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 822 days.

(21) Appl. No.: 18/017,779

(22) PCT Filed: Aug. 3, 2020

(86) PCT No.: PCT/EP2020/071758
§ 371 (c)(1),
(2) Date: Jan. 24, 2023

(87) PCT Pub. No.: WO2022/028665
PCT Pub. Date: Feb. 10, 2022

(65) Prior Publication Data
US 2023/0289655 A1      Sep. 14, 2023

(51) Int. Cl.
*G06N 20/00*       (2019.01)

(52) U.S. Cl.
CPC ..................................... *G06N 20/00* (2019.01)

(58) Field of Classification Search
CPC ..................................................... G06N 20/00
See application file for complete search history.

(56) References Cited

U.S. PATENT DOCUMENTS

| | | | | |
|---|---|---|---|---|
| 9,256,838 | B2 * | 2/2016 | Sow ........................ | G06N 20/20 |
| 10,621,019 | B1 | 4/2020 | Faulhaber, Jr. et al. | |
| 11,144,616 | B2 * | 10/2021 | Tan .......................... | G06F 17/18 |
| 11,886,969 | B2 * | 1/2024 | Zhang .................... | G06N 20/20 |
| 12,468,982 | B2 * | 11/2025 | Jagyasi .................. | G06N 3/126 |
| 2019/0318240 | A1 * | 10/2019 | Kulkarni ............... | G06F 9/5044 |
| 2020/0027022 | A1 * | 1/2020 | Jha ......................... | G06N 20/00 |
| 2020/0219015 | A1 * | 7/2020 | Lee ........................ | G06F 18/214 |
| 2021/0117780 | A1 * | 4/2021 | Malik .................... | G06Q 10/40 |
| 2021/0256309 | A1 * | 8/2021 | Huth ..................... | G06F 18/2148 |
| 2022/0101204 | A1 * | 3/2022 | Ly .......................... | G06N 20/10 |

(Continued)

OTHER PUBLICATIONS

W. Y. B. Lim et al., "Federated Learning in Mobile Edge Networks: A Comprehensive Survey," in IEEE Communications Surveys & Tutorials, vol. 22, No. 3, pp. 2031-2063, thirdquarter 2020, doi: 10.1109/COMST.2020.2986024, date of publication Apr. 8, 2020 (Year: 2020) (Year: 2020).*

(Continued)

*Primary Examiner* — Barbara M Level

(74) *Attorney, Agent, or Firm* — Carter, DeLuca & Farrell LLP

(57) ABSTRACT

It is provided a method comprising: monitoring if a request to train a machine learning sub-model is received from a meta-training host; generating training data; training the machine learning sub-model by at least a first subset of the training data if the request is received and at least the first subset of the training data is generated; checking if a predefined condition related to the machine learning sub-model is fulfilled; providing the trained machine learning sub-model and at least a second subset of the training data to the meta-training host if the condition is fulfilled.

6 Claims, 6 Drawing Sheets

(56)  References Cited

U.S. PATENT DOCUMENTS

| | | | |
|---|---|---|---|
| 2023/0068386 A1* | 3/2023 | Akdeniz | G06N 3/084 |
| 2023/0162089 A1* | 5/2023 | Farooq | G06N 3/08 |
| | | | 706/12 |

OTHER PUBLICATIONS

KR 20210132500 A, Jae Won Moon et al., Federated Learning System, filed Apr. 27, 2020, Korea Electronics Technology Institute, English translation. (Year: 2020).*

Mcmahan, Hugh Brendan, Google, WO-2018057302-A1, published Mar. 29, 2018. (Year: 2018).*

WO 2021/144803 Perepu, S. et al., Context Level Federated Learning, Telefonaktiebolaget LM Ericsson, English, filed Jan. 16, 2020. (Year: 2020).*

International Search Report and Written Opinion dated May 6, 2021 corresponding to International Patent Application No. PCT/EP2020/071758.

Martin Isaksson et al., "Secure Federated Learning in 5G Mobile Networks," Globecom 2020—2020 IEEE Global Communications Conference, Apr. 14, 2020, pp. 1-7, XP055793363.

Solmaz Niknam et al., "Federated Learning for Wireless Communications: Motivation, Opportunities, and Challenges," EEE Communications Magazine, vol. 58, No. 6, Jun. 1, 2020, pp. 46-51, XP011798620.

"Machine Learning for Dummies," IBM Limited Edition, Wiley, p. 4 (https://www.IBM.com/downloads/cas/GB8ZMQ3), 2018.

* cited by examiner

Training at cell/BS, aggregation at OAM

Training at UE,
aggregate at BS

| | |
|---|---|
| 110 | |
| 120 | |
| 130 | |
| 140 | |

| |
|---|
| 810 |
| 820 |

S110

Request DTHs to train ML sub-model

S120

Trained ML sub-model received from DTHs?

yes

S130

Combine trained ML sub-models to ML meta-model

S140

Train ML meta-model

DISTRIBUTED TRAINING IN COMMUNICATION NETWORKS

FIELD OF THE INVENTION

The present disclosure relates to distributed training of an ML model in a communication network.

Abbreviations

3GPP 3$^{rd}$ Generation Partnership Project
3G/4G/5G 3$^{rd}$/4$^{th}$/5$^{th}$ Generation
AI Artificial Intelligence
BS Base Station
CNF Cognitive Network Function
CU Centralized Unit
DTH Distributed-Training Host
DU Distributed Unit
eNB evolved NodeB (4G base station)
gNB 5G base station
ML Machine Learning
MTC Machine-Type Communication
MTH Meta-Training Host
NE Network Element
NG-RAN Next Generation RAN
OAM Operation and Maintenance
ORAN Open RAN
RAN Radio Access Network
RIC RAN Intelligent Controller
RRC Radio Resource Control
UE User Equipment
WiFi Wireless Fidelity

BACKGROUND OF THE INVENTION

Increased automation in networks implies that autonomy needs to be extended to ever more aspects of the network. In network management, designing algorithms for optimization of the network has proved to be complex. To overcome this challenge, Artificial Intelligence and Machine Learning (AI/ML) approaches, which eliminate the need for human design of the required algorithms, have been proposed. These AI/ML algorithms may be deployed in the network and service management planes where they replace human effort in fault, capacity and performance management for network domains and user services.

Machine learning is a form of Artificial Intelligence that enables a system to learn from data rather than through explicit programming (taken from Machine Learning For Dummies, IBM Limited Edition, Wiley page 4. https://www.ibm.com/downloads/cas/GB8ZMQZ3).

In managing the call sessions, a lot of data on the performance of the session and on the devices involved in such session is available and can be collected. This data can be used for optimizing and troubleshooting the call sessions using AI/ML algorithms. Similarly, the amount of human effort spent on developing optimal algorithms for signal processing should be reduced which can be achieved with the use of AI/ML algorithms able to learn the optimal processing.

The end result is that different areas of the network will be filled with AI/ML functions (herein also called Cognitive Network Functions (CNFs)) with learning being possible at different parts and domains of the network. For some of this learning, a distributed approach may be used (distributed learning).

The concept of distributed learning, known also as federated learning, is known within the machine learning community.

SUMMARY OF THE INVENTION

It is an object of the present invention to improve the prior art.

According to a first aspect of the invention, there is provided an apparatus comprising: one or more processors, and memory storing instructions that, when executed by the one or more processors, cause the apparatus to: monitor if a request to train a machine learning sub-model is received from a meta-training host; generate training data; train the machine learning sub-model by at least a first subset of the training data if the request is received and at least the first subset of the training data is generated; check if a predefined condition related to the machine learning sub-model is fulfilled; provide the trained machine learning sub-model and at least a second subset of the training data to the meta-training host if the condition is fulfilled.

According to a second aspect of the invention, there is provided an apparatus comprising: one or more processors, and memory storing instructions that, when executed by the one or more processors, cause the apparatus to: request plural distributed-training hosts to train a machine learning sub-model without providing any training data to the distributed-training hosts; check if a respective trained machine learning sub-model and respective training data are received from each of at least a subset of the distributed-training hosts; combine the received trained machine learning sub-models into a meta-model if the trained machine learning sub-models are received from the subset of the plural distributed-training hosts; train the meta-model by means of the received training data to obtain a trained meta-model.

According to a third aspect of the invention, there is provided a method comprising: monitoring if a request to train a machine learning sub-model is received from a meta-training host; generating training data; training the machine learning sub-model by at least a first subset of the training data if the request is received and at least the first subset of the training data is generated; checking if a predefined condition related to the machine learning sub-model is fulfilled; providing the trained machine learning sub-model and at least a second subset of the training data to the meta-training host if the condition is fulfilled.

According to a fourth aspect of the invention, there is provided a method comprising: requesting plural distributed-training hosts to train a machine learning sub-model without providing any training data to the distributed-training hosts; checking if a respective trained machine learning sub-model and respective training data are received from each of at least a subset of the distributed-training hosts; combining the received trained machine learning sub-models into a meta-model if the trained machine learning sub-models are received from the subset of the plural distributed-training hosts; training the meta-model by means of the received training data to obtain a trained meta-model.

Each of the methods of the third to fourth aspects may be a method of machine learning.

According to a fifth aspect of the invention, there is provided a computer program product comprising a set of instructions which, when executed on an apparatus, is configured to cause the apparatus to carry out the method according to any of the third to fourth aspects.

The computer program product may be embodied as a computer-readable medium or directly loadable into a computer.

According to some embodiments of the invention, at least one of the following advantages may be achieved:

federated learning may be adopted to the characteristics of communication networks;

resources of the communication network may be optimally exploited for machine learning.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Figure 1:
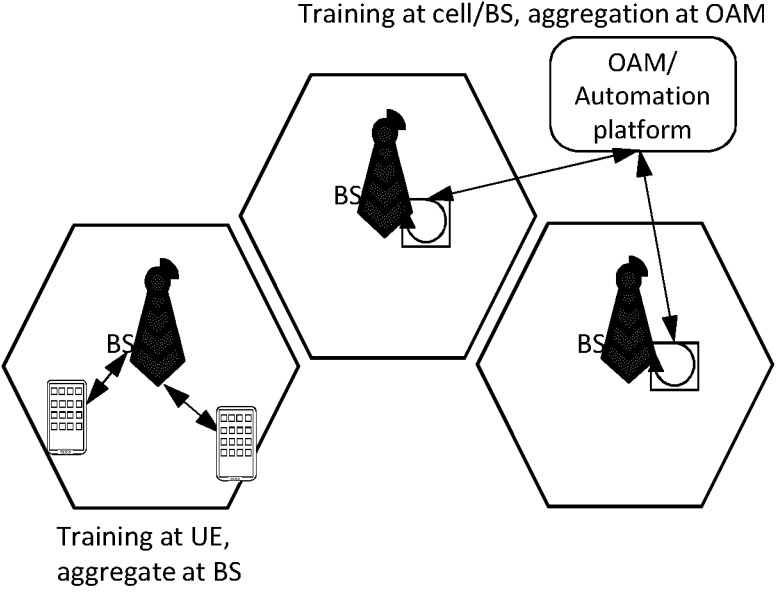
FIG. 1 shows a concept of distributed training in RAN and network management (OAM)

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some example embodiments of this invention provide a system and mechanism for distributed learning.

For some network-related machine learning use cases, training may be done in a distributed way but yet the different observations of the distributed units need to be aggregated for good decision at inference (prediction making). Each instance of the model at the distributed entity has only a subset of the data available for the training because it does not have the data of the other instances of the distributed entity. Thus, only suboptimal performance can be achieved using a model trained separately at each instance of the distributed entity. Better performance may be achieved with a single model that combines the knowledge of the different model instances.

Examples of such use cases include the following:

1. NG-RAN-UE: It may be preferred to undertake training at the UE instead of training in the e/gNB. This is the case if the amount of data required (or used) for training would be too much to be signalled from the UE across the expensive wireless channel to e/gNB. An example application here could be to create a model of the relationship between the localization and mobility observations of the UE. The ML model is preferably trained at the UE to minimize the amount of data exchange, while the different models trained at the UEs should be aggregated at the gNB to create a single model for the entire cell.

2. Core Network-UE: with so many UEs in the network, learning the performance of different call sessions at a centralized location may imply sending large amounts of data throughout the network. Instead, part of the training could be done in a distributed form at the UEs, and the models are aggregated in the Core network after they are adequately trained by the UE.

3. CU-DU: In a split gNB, it may be necessary to learn a policy at the centralized Unit (CU) using data available at the distributed Units (DUs). Yet again, the transmission of such data may clog the available signaling resources between the DUs and CU. Hence, one may undertake some of the learning at the DUs and aggregate the learned models at the CU.

4. OAM-gNB: A typical implementation of centralized network optimization solutions is that the base stations send the data to the OAM for the OAM to figure out what to do. This is fine if the OAM relies on small amount of data (e.g. on single events) combined with more or less complex human designed algorithms to select the decision. For learning the decision however, large amounts of data may be needed the transfer of which to OAM may be too costly for the network. Instead, it may be better if part of the training is done in a distributed form at the base stations, and the learned models are aggregated at the OAM. The same may apply if a standalone automation platform replaces the general-purpose OAM in undertaking the network automation, as it is proposed in ORAN by introducing the RIC.

FIG. 1 shows a conceptual example, with plural levels of distributed learning. For example, as shown on the left side, training is first done at the UE, and the result of the trainings at plural UEs is aggregated at the base station (gNB/eNB). Furthermore, as shown on the right side, training may be first done at the base stations, and the result of the trainings at plural base stations is aggregated at OAM or an automation platform. In principle, the training at the BS may be the aggregation of the training results of the UEs, such that two levels of aggregation (for each of plural BSs: UEs to respective BS; then from the plural BSs to OAM) may be achieved.

The concept of distributed learning has not been extended or used in communication networks, although these networks can significantly benefit from its application. To our knowledge, there is no prior art on federated learning in communication systems. There are no mechanisms defined to implement or support such learning, be it between the base stations and UEs, between the core network and UEs, or between OAM or its related automation platforms and the base stations from which the training data is sourced.

Some example embodiments of the invention provide a mechanism to support distributed training of machine learning models in communication networks and the related aggregation of the models through a meta learning process. The entity that undertakes distributed training, herein called a Distributed Training Host (DTH), trains and generates a sub-model while the entity that aggregates the sub-models, here called the Meta Training Host (MTH), generates the final aggregated model, also called a Meta-model. The invention proposes the processes through which the MTH specifies the kind of sub-model that the DTHs should train. The DTHs provide the trained sub-model and training data used to train the meta model to MTH. In addition, some example embodiments include an optional process of downloading the trained meta model to the inference host. In communication networks, the inference host may be the DTH.

Figure 2:
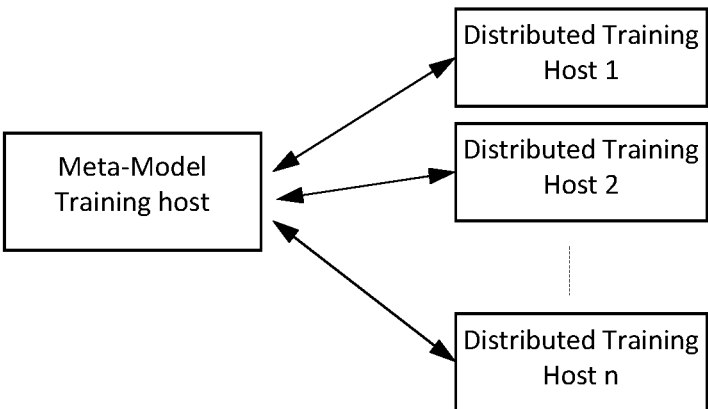
FIG. 2 shows a general concept of some example embodiments of the invention.

The general concept of some example embodiments of the invention is shown in FIG. 2. The interface between the MTH and the DTHs may support the configuration of sub-models, the upload of trained sub-models and subsets of the DTH's training to the MTH, and optionally the download of the trained meta-model and its sub-models to all the DHTs. Also as an option, it may support transmission of training maturity conditions to the DTHs.

Figure 3:
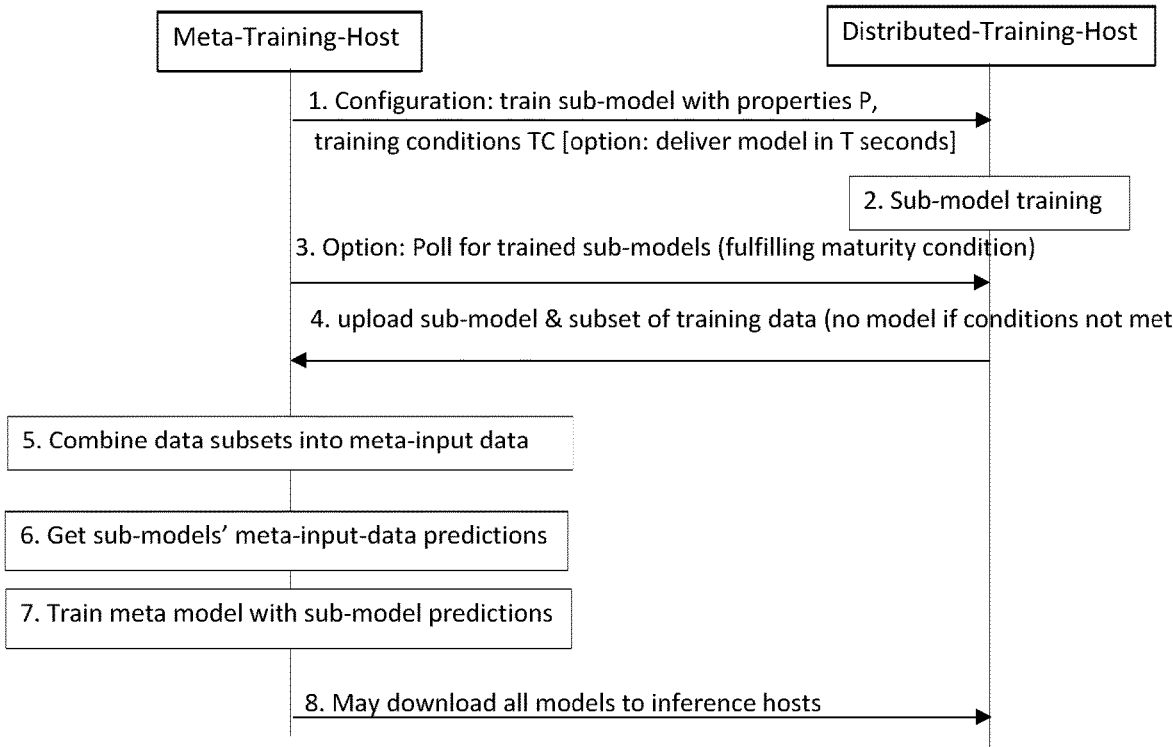
FIG. 3 shows a message flow according to some example embodiments of the invention.

An example embodiment of the invention is shown in FIG. 3. For example (not limiting), the MTH may be a gNB, and the DTHs may be UEs. In general, the DTHs are network elements of a communication network that may be actively involved in the communication throughout the network. The MTH learns a meta-model by aggregating multiple trained sub-model instances from the DTHs. The process of FIG. 3 includes the following message exchanges and actions:

1. The MTH specifies and configures the DTHs with training requirements. This includes:
   a. Configuration of the sub-model properties to the DTHs. E.g. the e/gNB defines a class and characteristics of the machine learning model to be used at the UE. Note that message 1 does not comprise any training data because these are generated at the DTH. In addition, MTH may optionally specify to DTHs one or more of the following:
   b. MTH may inform the DTHs that the model is a sub-model that must later be aggregated at the gNB (MTH).
   c. a maturity condition that the DTH may use to evaluate whether the model has been adequately trained. Examples of such conditions may include specified lowest thresholds for a test or a validation score; a minimum number of observations used to train the model; a minimum number of observed network events; or any combination of these and other maturity conditions. The maturity condition may not be provided in message exchange 1 but in message exchange 3 instead.
   d. The MTH needs some of the training data available at the DTH for use towards training the meta model, so the specification may also include the amount (e.g. 10%) of DTH data that DTH should send to the MTH. In some example embodiments, the amount may be indicated in message exchange 3 instead.

2. The DTH trains the sub model as specified by the MTH. E.g. each UE uses the data it generates in performing its communication tasks to fit (train) its respective sub-model.
3. The MTH may poll the DTHs to determine those DTHs that have a respective mature sub-model which can be used to train the meta model. If the maturity condition was not configured at the initial request for sub-model training (message exchange 1), the poll may specify the maturity condition to be checked by the DTH before responding to the poll. A maturity condition included in the poll may replace a maturity condition provided in message exchange 1. Correspondingly to the maturity level, message exchange 3 may include an indication of the amount of training data to be provided from each DTH to MTH.
4. The DTHs which fulfils the maturity conditions specified in steps 1 or 3 upload to the MTH their respective trained sub-model. Each of the DTHs also sends to MTH a subset of its training data that was used to train the sub-model. The data may either be a fixed amount, or as configured in message exchange 1 or 3 (e.g. 10%). In the RAN examples, each UE whose model fulfils the specified maturity condition would send a subset of its data and its trained model to the e/gNB.
5. The MTH combines the data subsets to create the meta-input data set, which may be split into the typical three parts—training, validation and testing datasets. E.g. the gNB combines the data subsets from multiple UEs to create the gNB's meta-input data set.
6. The MTH runs the input training data through the sub-models to get the respective predictions of the sub-models. The sub-models' predictions then serve, when combined across all sub-models, as the training data for the meta model (meta training data).
7. The MTH trains the meta-model using the meta training data. E.g. the e/gNB uses the predictions from multiple UE sub-models to train the meta model.
8. The MTH may then use the meta model for inference or may send (download) the meta model and related sub-models to the inference host(s) where the trained meta-model is executed (in FIG. 3 assumed to be the same as the DTH).

With respect to actions 7 and 8, there are at least two options:

Option 1: the predictions of all (or a subset of) the sub-models are considered for inference at each DTH. In this case, the sub-models are sent to the DTHs to be used for inference. Then, each DTH generates plural predictions based on the trained sub-models and aggregates them in the trained meta-model.

In detail, assuming each DTH i sends to MTH sub-model Mi and data Di, which was part of the data used to train Mi at the MTH. The MTH performs the following actions:

1. For each i, Di is taken through the other sub-models (Mj, i≠j)
2. For each i, the prediction of Mj is input into the meta-model. Thus, one may retain the knowledge of all the sub-models. One may take their combined predictions and try to amalgamate it but also capture what the local model Mi says is the right outcome.
3. For each i, The output of the meta-model is compared with the output of sub-model Mi—a loss is computed
4. The observed loss is used to back-propagate through the meta model and adjust its parameters (to train the meta-model).

As this is done for all sub-models Mi and their data Di, the meta-model is trained to learn to predict exactly what each sub-model would predict. And the mixing of the input from all sub-models increases the chances of realizing a single fused model (e.g. through summation, averaging, etc). Since the inputs of the meta-model are the predictions of the sub-models, the sub-models need to be available at the inference host(s) for use at inference. Therefore, MTH transmits in this option the sub-models to the inference host(s).

Option 2: Simply predict what each sub-model would predict, no concern what other sub-models may predict. According to this option, there is no need to send any sub-models to the inference host(s) for use at inference. It is sufficient that the MTH sends the trained meta-model to the inference host(s).

In that option, the MTH performs the following actions
1. For each i, the raw source data Di is used as input to the meta-model [without taking that data through the other sub-models]
2. Then the loss is computed between the meta-model's prediction and the prediction of the sub-model Mi. (as in step 3 above).
3. Then, the meta-model is trained (as in step 4 above), In the end, the meta model will have learned to predict what sub-model Mi would predict but without input from the other sub-models. In this case, the sub-models do not need to be sent to the inference host(s) for use at inference. The risk here is that the final meta-model may not be a single fused model but in fact be a stacking of compressed versions of the individual sub-models, with a higher chance for suboptimal performance compared to option 1. On the other hand, the computational effort at inference is lower than at option 1.

In some example embodiments, MTH may not provide a maturity condition to the DTHs. In some of these embodiments, MTH polls the DTHs to provide their respective trained sub-models irrespective of the maturity level of the training. In some other of these embodiments, the maturity level is predefined in the DTH such that MTH need not to provide it.

In some example embodiments, MTH may not poll the DTHs to provide the trained sub-models. Instead, DTH may upload the respective trained sub-model to MTH if the maturity level is reached.

In some example embodiment, MTH may send all the trained sub-models to the inference host(s). One or more of the DTHs may be an inference host. If the inference host is one of the DTHs, it knows already its own trained sub-model. Therefore, in some example embodiments, MTH does not sent the trained sub-model of a DTH back to the DTH for execution (use at inference). In this case, MTH sends only the trained sub-models of the other DTHs.

Example Implementation: RAN-UE

Figure 4:
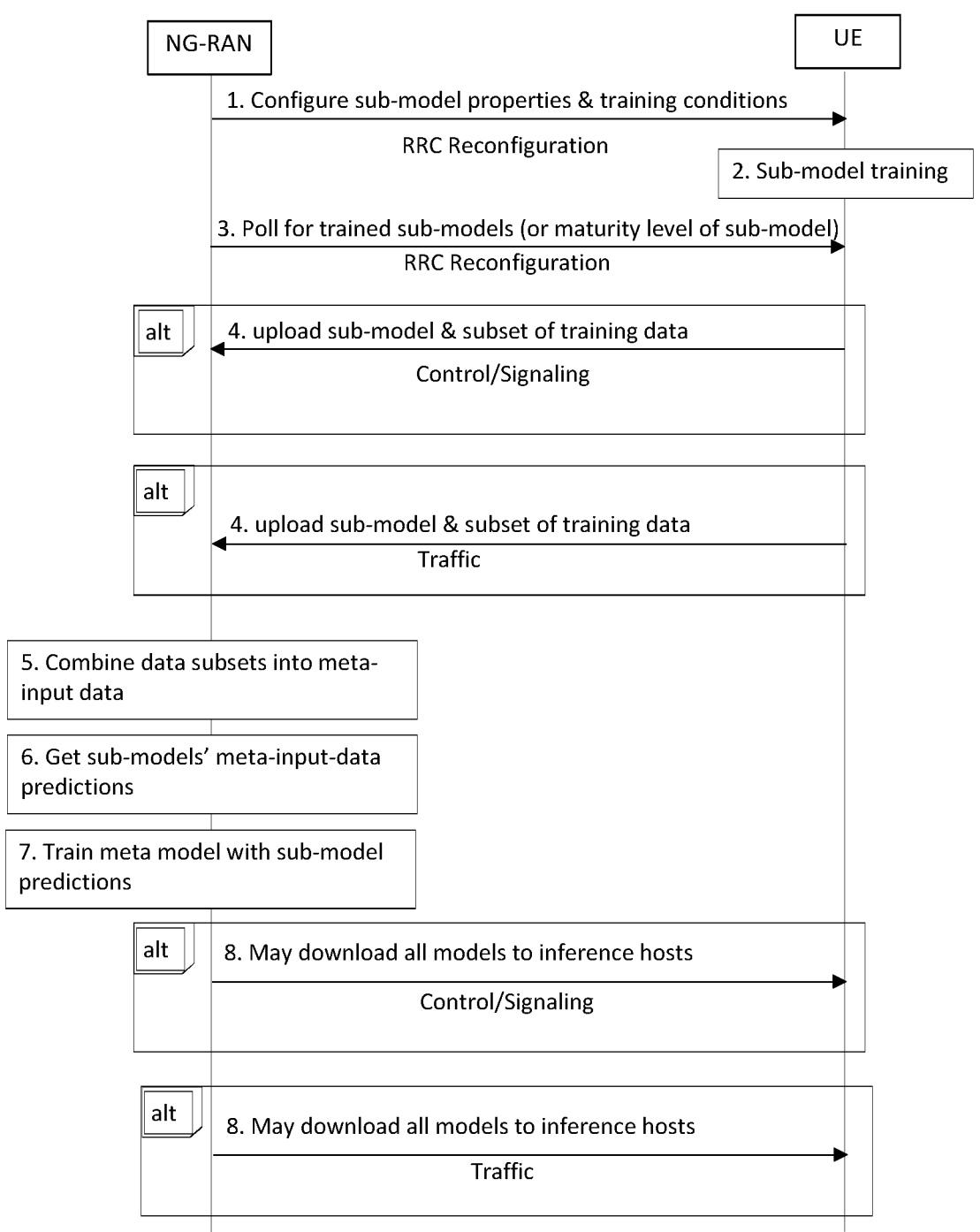
FIG. 4 shows a message flow according to some example embodiments of the invention.

An implementation of the general concept of FIG. 3 in the RAN (e.g. NG-RAN) is depicted in FIG. 4. Here, RAN (e.g. gNB) is the MTH, and the UEs are DTHs. The message exchanges and actions in FIG. 4 are numbered in the same way as in FIG. 3 such that only differences to FIG. 3 are explained. It is recommendable that the message exchanges 1, 3, 4, and 8 are standardized, while the actions 2 and 5 to 7 are internal to the respective NE such that a standardization is not needed.

The message exchanges 1 and 3 may be implemented via signalling, for instance as RRC reconfiguration messages.

Two alternative implementations are available for the delivery of the sub-models to the MTH (message exchange 4) and/or the download of the final Meta model to the inference host (message exchange 8). According to one alternative implementation, the models may be exchanged by signalling (e.g. RRC signalling). However, exchanging the models may imply transferring large amounts of data. As an alternative implementation, one may transfer the model(s) as scheduled traffic (e.g. in one or more files). The message exchanges 4 and 8 may be implemented by the same of these alternative implementations or by different ones of them.

Example Implementation: OAM-NG-RAN

Figure 5:
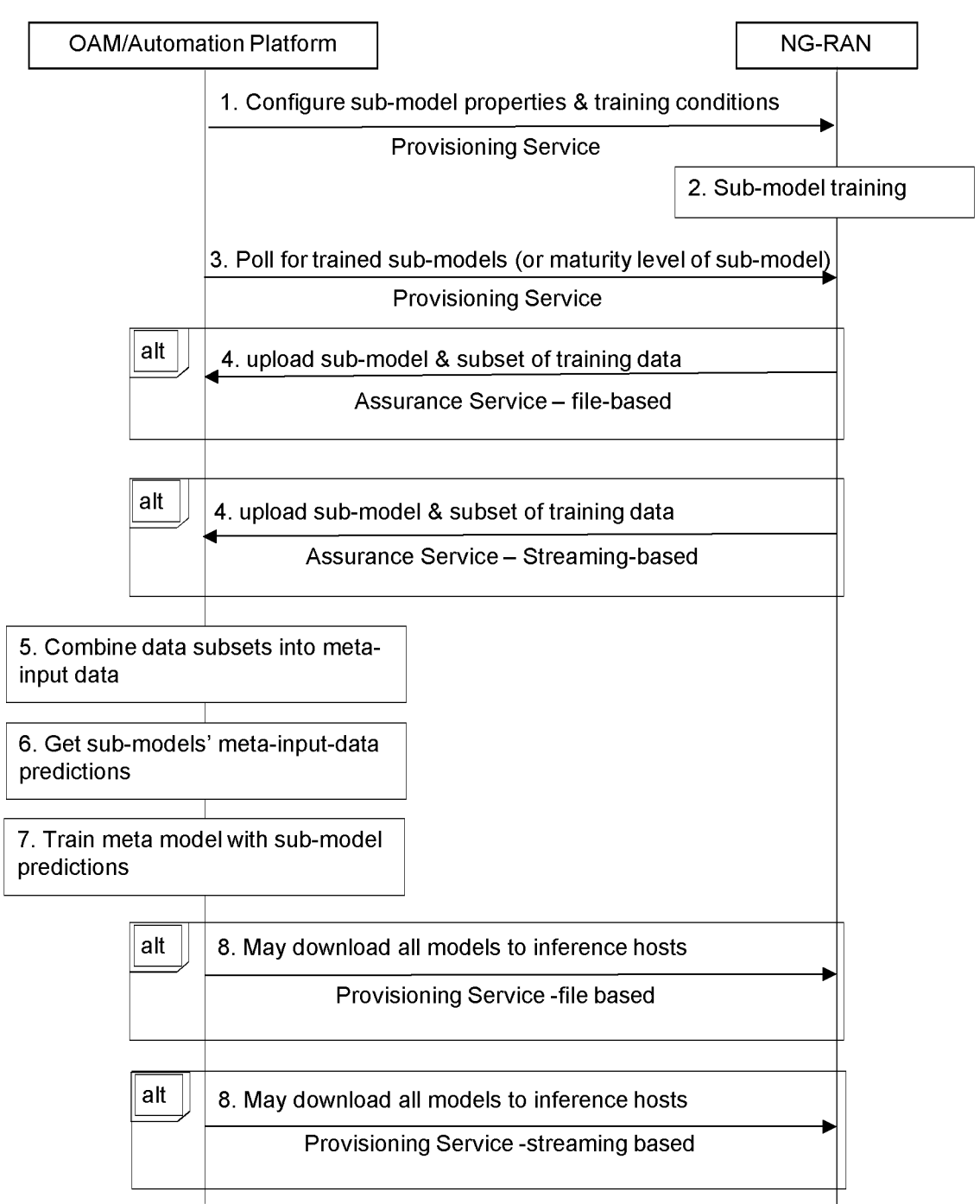
FIG. 5 shows a message flow according to some example embodiments of the invention.

An implementation of the general concept of FIG. 3 involving OAM or an automation platform is depicted in FIG. 5. Here, OAM (or the automation platform) is the MTH, and RAN NEs (e.g. gNBs) are DTHs. The message exchanges and actions in FIG. 5 are numbered in the same way as in FIG. 3 such that only differences to FIG. 3 are explained. It is recommendable that the message exchanges 1, 3, 4, and 8 are standardized, while the actions 2 and 5 to 7 are internal to the respective NE such that a standardization is not needed.

The procedure in this example implementation may be implemented using a service-based framework as illustrated in FIG. 5. The sub-model configuration and polling in message exchanges 1 and 3 may be implemented via provisioning services provided by the NG_RAN. The delivery of the sub-models to the MTH may be accomplished via an assurance service offered by the NG_RAN and to which the OAM or the respective automation platform is a consumer. Such a service could use file-based transfer mechanism or a streaming service (shown as alternatives in FIG. 5). On the other hand, or the download of the final Meta model to the inference host may also be accomplished via a provisioning service supporting file transfer or by streaming, in particular for a large number of configuration parameters. Note, however, that older mechanisms could also be used here: e.g., Bulk Configuration Management for steps 1, 3 and 8 or file-based notification for step 4. The message exchanges 4 and 8 may be implemented by the same of these alternative implementations or by different ones of them.

Figure 6:
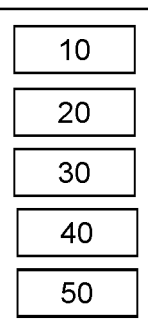
FIG. 6 shows an apparatus according to an example embodiment of the invention.
Figure 7:
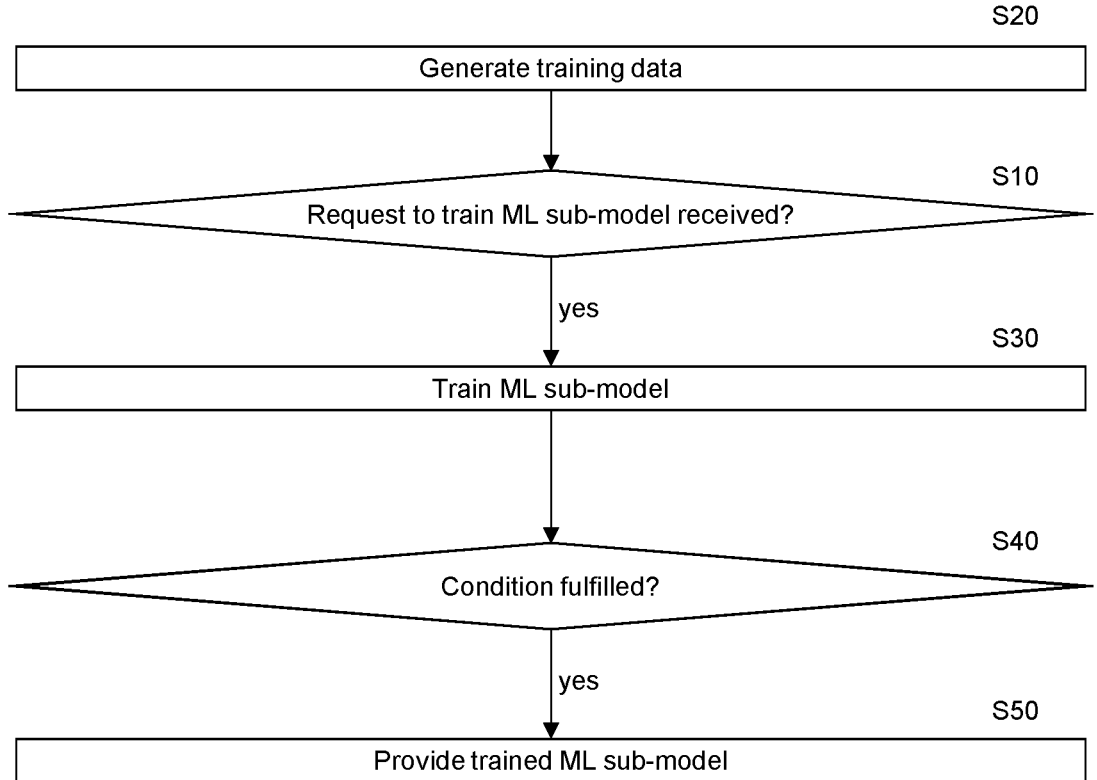
FIG. 7 shows a method according to an example embodiment of the invention.

FIG. 6 shows an apparatus according to an embodiment of the invention. The apparatus may be a DTH, or an element thereof. FIG. 7 shows a method according to an embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises means for monitoring 10, means for generating 20, means for training 30, means for checking 40, and means for providing 50. The means for monitoring 10, means for generating 20, means for training 30, means for checking 40, and means for providing 50 may be a monitoring means, generating means, training means, checking means, and providing means, respectively. The means for monitoring 10, means for generating 20, means for training 30, means for checking 40, and means for providing 50 may be a monitor, generator, trainer, checker, and provider, respectively. The means for monitoring 10, means for generating 20, means for training 30, means for checking 40, and means for providing 50 may be a monitoring processor, generating processor, training processor, checking processor, and providing processor, respectively.

The means for monitoring 10 monitors if a request to train a machine learning sub-model is received from a meta-training host (S10). The means for generating 20 generates training data (S20). S10 and S20 may be performed in an arbitrary sequence. They may be performed fully or partly in parallel.

If the request is received (S10=yes) and at least a first subset of the training data is generated by S20, the means for training 30 trains the machine learning sub-model by the training data (S30).

The means for checking 40 checks if a predefined condition related to the machine learning sub-model is fulfilled (S40). For example, the predefined condition may comprise a poll for the machine-learning sub-model received from the meta-training host, or that the training fulfills a certain maturity condition.

If the condition is fulfilled (S40=yes), the means for providing 50 provides the trained machine learning sub-model and at least a second subset of the training data to the meta-training host (S50).

Figures 8, 9, 10:
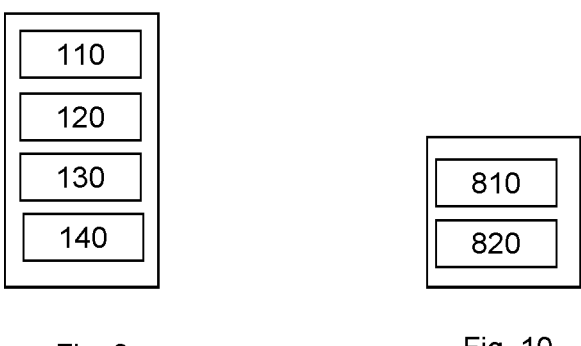
FIG. 8 shows an apparatus according to an example embodiment of the invention.
FIG. 9 shows a method according to an example embodiment of the invention.
FIG. 10 shows an apparatus according to an example embodiment of the invention.

FIG. 8 shows an apparatus according to an embodiment of the invention. The apparatus may be a MTH, or an element thereof. FIG. 9 shows a method according to an embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for requesting 110, means for checking 120, means for combining 130, and means for training 140. The means for requesting 110, means for checking 120, means for combining 130, and means for training 140 may be a requesting means, checking means, combining means, and training means, respectively. The means for requesting 110, means for checking 120, means for combining 130, and means for training 140 may be a requestor, checker, combiner, and trainer, respectively. The means for requesting 110, means for checking 120, means for combining 130, and means for training 140 may be a requesting processor, checking processor, combining processor, and training processor, respectively.

The means for requesting 110 requests plural distributed-training hosts to train a machine learning sub-model (S110). Any training data are not provided to the distributed-training hosts.

The means for checking 120 checks if a respective trained machine learning sub-model and respective training data are received from each of at least a subset of the distributed-training hosts (S120). In some example embodiments, the means for checking 120 may check if a respective trained machine learning sub-model and respective training data are received from each of the distributed-training hosts. For example, the trained machine learning sub-model and training data may be received due to a poll from the distributed training-hosts.

If the trained machine learning sub-models are received from the subset of the plural distributed-training hosts (S120=yes), the means for combining 130 combines the received trained machine learning sub-models into a meta-model (S130). The means for training 140 trains the meta-model by means of the received training data to obtain a trained meta-model (S140).

FIG. 10 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 7 and 9 and related description.

Some example embodiments are explained with respect to a 5G network. However, the invention is not limited to 5G. It may be used in 3G or 4G networks and 3GPP networks of future generations if they support distributed training. It is not even limited to 3GPP networks. It may be used in other wired or wireless communication networks (e.g. WiFi networks).

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

A terminal (UE) may be e.g. a mobile phone, a smartphone, a MTC device, a laptop etc. The user may be a human user or a machine (e.g. in machine-type communication (MTC)).

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a distributed training-host being a component of a communication network such as a UE, an MTC device, a RAN network element (such as a gNB or eNB) or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, an meta-training host such as a RAN, or a component thereof (e.g. eNB or gNB), an OAM, or an automation platform, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:

one or more processors, and at least one memory storing instructions that, when executed by the one or more processors, cause the apparatus to:

monitor if a request to train a machine learning sub-model is received from a meta-training host;

generate training data;

train the machine learning sub-model using at least a first subset of the training data if the request is received and at least the first subset of the training data is generated;

supervise if the training of the machine learning sub-model fulfills a maturity condition;

check if a predefined condition related to the machine learning sub-model is fulfilled;

provide the trained machine learning sub-model and at least a second subset of the first subset of training data used to train the machine learning sub-model to the meta-training host if the predefined condition is fulfilled; and inhibit the providing the trained machine learning sub-model if a maturity level does not fulfill the maturity condition, wherein the maturity condition is received from the meta-training host, and wherein the maturity condition comprises:

specified lowest thresholds for a test or a validation score, a minimum number of observations used to train the machine learning sub-model, and a minimum number of observed network events.

2. The apparatus according to claim 1, wherein the predefined condition comprises that the training of the machine learning sub-model fulfills the maturity condition.

3. The apparatus according to claim 1, wherein the predefined condition comprises that a poll from the meta-training host is received.

4. The apparatus according to claim 1, wherein the instructions, when executed by the one or more processors, further cause the apparatus to:

actively involve in a communication; wherein the training data are generated based on the actively involving.

5. The apparatus according to claim 1, wherein the instructions, when executed by the one or more processors, further cause the apparatus to:

monitor if a trained meta-model is received from the meta-training host; and use the trained meta-model for inference if the trained meta-model is received.

6. The apparatus according to claim 5, wherein the instructions, when executed by the one or more processors, further cause the apparatus to:

monitor if a plurality of further sub-models are received from the meta-training host; and use the received further sub-models and the trained meta-model for inference if the trained meta-model and the further sub-models are received.

* * * * *